United States Patent [19]

Yamashita et al.

[11] 4,299,344
[45] Nov. 10, 1981

[54] MOUNT FOR PORTABLE RADIO COMMUNICATION UNIT

[75] Inventors: Koji Yamashita; Takashi Oyamada, both of Tokyo, Japan

[73] Assignee: Nippon Electric Co., Ltd., Tokyo, Japan

[21] Appl. No.: 159,858

[22] Filed: Jun. 16, 1980

[30] Foreign Application Priority Data

Jun. 28, 1979 [JP] Japan .................. 54-88984[U]

[51] Int. Cl.³ .............................................. A45F 5/02
[52] U.S. Cl. .................................... 224/242; 224/252; 248/314; 312/7 R; 455/351
[58] Field of Search .................. 220/246, 247, 248; 312/7 R; 248/314, 307; 224/242, 245, 247, 252; 455/351, 334; 206/1.5

[56] References Cited

U.S. PATENT DOCUMENTS

| | | | |
|---|---|---|---|
| 2,673,008 | 3/1954 | Ryan | 248/314 X |
| 3,171,544 | 3/1965 | Unsworth | 248/314 X |
| 3,691,994 | 1/1972 | MacKzum, Jr. | 224/252 |
| 3,956,701 | 5/1976 | James, Jr. et al. | 455/351 X |
| 4,046,295 | 9/1977 | Eichler | 224/242 |
| 4,083,481 | 4/1978 | Selinko | 224/252 |

FOREIGN PATENT DOCUMENTS 52-31402 8/1977 Japan .

Primary Examiner—Allan N. Shoap
Attorney, Agent, or Firm—Laff, Whitesel, Conte & Saret

[57] ABSTRACT

A portable radio unit includes guide grooves extending in the longitudinal direction, on both the sides thereof. A step portion in a part of at least one of the guide grooves has a width which is greater than the guide grooves. A mount for the portable radio has an integral back plate, side plates, and a guide plate for slidably engaging the guide grooves. A notch portion is formed on one of the guide plates. A latch is secured on the outside of one of the side plates for engaging the step portion and fixing the position of the portable unit when it is completely received in the mount. Thus, the carrying mount can retain and hold the portable radio unit without projections which might pose any danger to the operator and there are no restrictions on the appearance and the design of the portable unit.

6 Claims, 4 Drawing Figures

MOUNT FOR PORTABLE RADIO COMMUNICATION UNIT

The present invention relates to mounts for portable radio communication unit, such as a personal transmitter/receiver.

Generally, a portable radio communication unit of the pertinent type can be held in one hand when it is used. It is placed in a carring mount attached to one's belt when it is not used.

A conventional carrying mount of this type (such as that disclosed in U.S. Pat. No. 4,046,295) has an integral loop having open-ended top and bottom so that the portable unit may be inserted from above. This portable unit has projections on the sides and a speaker grill on the front thereof. The carrying mount has ribs on its inside to engage with the projections, an elongate back plate, and a latch in an upper portion of the back plate for stably holding the carrying mount.

The carrying mount can readily accommodate portable units of different lengths because it has the open-ended top and bottom. However, the carrying mount is usually positioned in front of operator's body so that the operator can readily handle the portable units. Therefore, the longer type of portable units stand in the way of the operator, particularly limiting freedom of leg motion.

The projections on the sides of the portable unit must be provided at a fixed position irrespective of the length of the portable unit. This imposes limitations on the appearance and the design of the portable units, furthermore, the portable unit must always be inserted into the carrying mount, facing in such a direction that the speaker grill faces outwardly to emit sound (i.e., on the side opposite the back plate), which proves to be troublesome.

If the carrying mount is shaped like a loop, as if to encircle the portable unit, it looks thick and bulky when the portable unit is removed from the mount.

Another conventional carrying mount (for example, Japanese Utility Model Application Disclosure No. 31402/79) comprises a back plate (or attachment plate). Small side plate projections have U-shaped notches or slots. A latch on the upper end of the back plate holds the unit, when in place. The portable radio unit has flanged projections on both sides of the unit. When the portable unit is not used, it is placed in the carrying mount so that the U-shaped notches or slots can retain the flanged projections and the latch can catch the upper end corner of the portable unit.

In the portable unit, the flanged projections might hamper an operation by hand and give a sense of danger to the operator. In addition, the portable unit housing must be shaped so that the flanged projections can retain the entire weight of the portable unit. Furthermore, the side plate projections of the carrying mount give a sense of danger to operators. When the carrying mount is attached to the belt of a person, it is quite difficult and complicated to handle the latch since it moves toward the body.

The object of the present invention is to provide a mount for carrying a portable radio communication unit, which mount is free of the above mentioned defects.

According to this invention, a combination of a portable communication unit includes guide grooves extending in the longitudinal direction, on both the sides of the unit. A step portion is provided in a part of at least one of the guide grooves and has a width which is greater than the guide grooves. A mount for the portable unit includes an integral back plate, side plates, and guide plates extending along the longitudinal end of the side plates, for slidably engaging the guide grooves, respectively. A notch portion is formed on a part of one of the guide plates. A latch is secured on the outside of one of the side plates for engaging the step portion on the unit and fixing the portable unit when it is completely received in the mount.

The features of the carrying mount according to the present invention are that it can retain and hold the portable radio unit without requiring any projections which might pose danger to a manually operated radio unit. It imposes no restrictions on the appearance and the design of the portable unit. It is easily and freely detachable with one hand. It has no directionality in mounting the portable unit further, the mount itself is compact and thin and is free of projections which might be dangerous to the operator.

The present invention will be now explained in further detail referring to the attached drawings in which.

Figure 1:
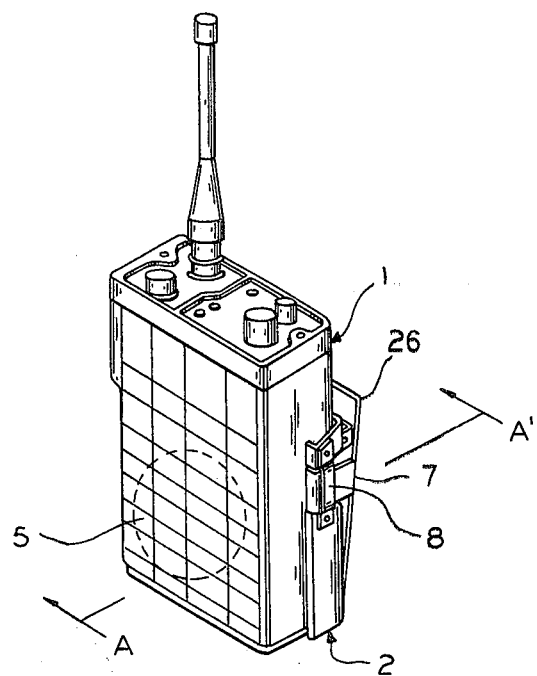
FIG. 1 is a perspective view of a portable radio communication unit which is placed inside the carrying mount of the present invention.
Figure 2:
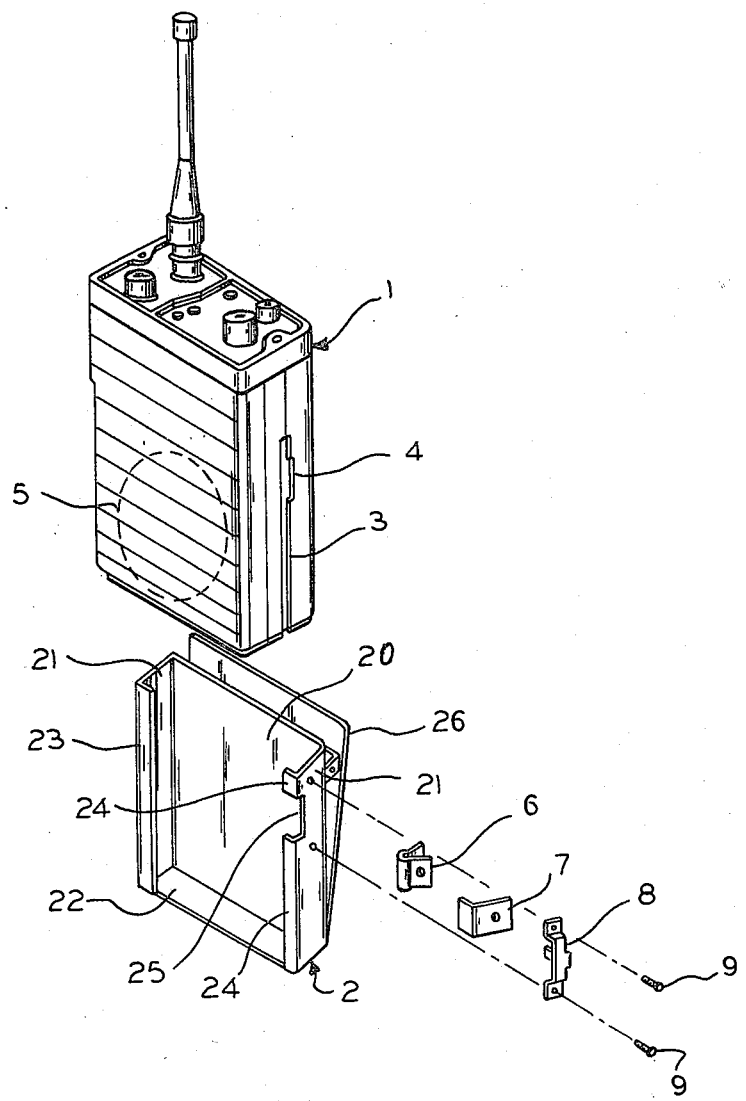
FIG. 2 is a perspective view of the portable radio unit which is removed from the carrying mount with the latch means shown in an exploded view.

In FIGS. 1 and 2, guide grooves 3 extend longitudinally along an approximate center and on both sides of the housing of a portable radio unit 1. About halfway or at the end of the guide grooves 3 portions 4 have a width which is wider than the rest of the groove, so as to form a step-wise portion. The portable unit 1 has a speaker grill 5 on the front side.

On the other hand, a carrying mount 2 has open-ended top and front. It is an integral piece of metal or plastic having a back plate or wall 20, side plates 21, bottom plate 22 and guide plates or pieces 23 and 24. The guide pieces 23 and 24 are provided at the edge or the end of the side plates 21 to engage with the guide grooves 3 of the portable radio unit 1. The radio unit 1 is constructed to be slidably inserted, from above, into the carrying mount 2.

Figure 3:
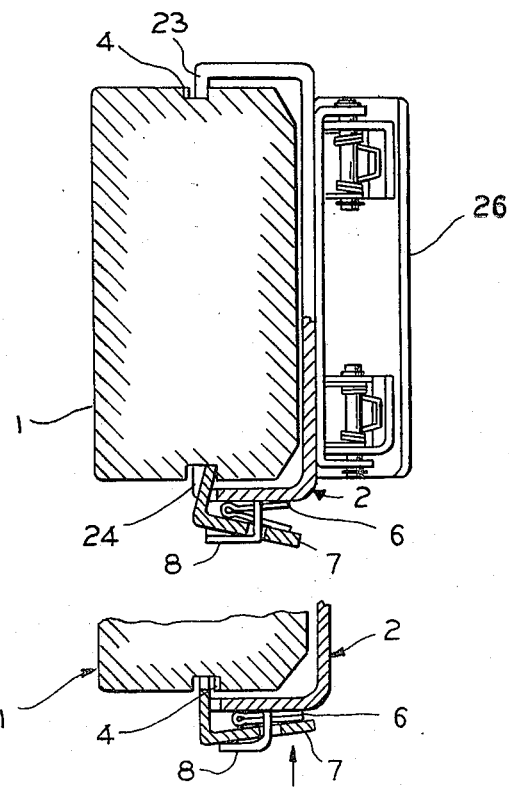
FIGS. 3 and 4 are fragmental cross sectional views taken along the lines A—A' of FIG. 1.

A latch means includes an approximately L-shaped engagement piece 7, a pressed metal plate 8, and a notched plate spring 6 (or a helical spring). The latch means is fixed on the side plate 21 by using screws 9 as shown in FIG. 2. The engagement piece 7 bits into and becomes engaged with the step portion 4 in the guide groove 3, when the radio unit 1 is placed inside the mount 2, as shown in FIG. 3. In other words, the L-shaped engagement piece 7 is spring biased to a position where its point slightly and constantly protrudes beyond the guide piece 24, by the plate spring 6. When the guide pieces 23 and 24 slide into the guide grooves 3, the pointed end of the engagement piece 7 is pushed up by the guide groove 3. Thus, the radio housing and the mount slide together with the guide piece 24 inside the guide groove 3. When the engagement piece 7 comes to the step portion 4 of the guide groove 3, it becomes engaged in the step portion 4 under a constant bias pressure of the spring 6, thereby securely holding the radio unit within the mount.

Figure 4:
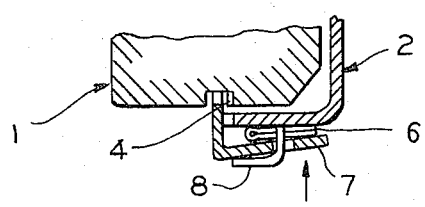

Conversely, the radio unit is easily taken out of the mount 2 by pressing the cantilevered end of engagement piece 7 at the point indicated by an arrow in FIG. 4. As piece 7 pivots, the pointed end releases the step portion 4 of the guide groove 3, and thereby enables the unit 1 to slide upwardly. Outside the rear side of the mount 2 is a butterfly clip 26 to secure it to a person's belt, etc.

The step portion 4 may be provided on only one of the sides of the guide grooves 3. The bottom plate 22 of the mount 2 may be dispensed with in FIG. 2.

The portable unit of the present invention is constructed, as above described, to enable a removal of projections from the radio unit. If the unit is to be integrally moulded from plastics, etc., the portable unit housing may be formed easily and the guide grooves may be used as a stopper for preventing the housing from slipping off the mount. In addition, since the guide pieces 23 and 24 wholly engages the entire guide grooves 3, the portable unit and the mount jointly have a high mechanical strength at the location where holding occurs.

When the unit is removed from the mount, the mount is quite thin and unobtrusive. It is free of any projections at the front which might give the wearer a sense of danger. As for operability, the portable unit may be inserted into the amount quite readily by simply sliding and pushing it into the mount without regard to its directions. Removing of the unit is achieved by a one hand operation by pushing the engagement piece and holding the unit in one hand.

What is claimed is:

1. A combination of a portable unit including a housing having longitudinal guide grooves on opposing sides thereof, and a step portion formed in a part of at least one of said guide grooves and having a width that is wider than said guide grooves; and a mount for said portable unit comprising: an integral means having a back plate, side plates, guide plates formed longitudinally along edges of said side plates for slidably engaging said guide grooves, respectively, a notch portion formed in a part of one of said guide plates; and a latch means secured on the outside of one of said plates for engaging said step portion and fixing said portable unit when said portable unit is completely received with said mount.

2. A combination of a portable unit including a housing with longitudinal guide grooves extending along substantially center lines of the opposing housing sides, and a step portion formed in at least one of said guide grooves, said step portion having a width which is wider than said guide grooves; and mount means for said portable unit comprising: an integral means including a back plate, side plates, guide plates on the longitudinal edges of said side plates for slidably engaging said guide grooves, respectively, a notch portion on at least a part of one of said guide plates; and a latch means secured on the outside of one of said side plates for engaging one of said step portions and fixing said portable unit when said portable unit is completely received in said mount.

3. A combination of claim 1 or 2, wherein said mount further comprises securing means on the back of said back plate.

4. A combination of claim 3, wherein said securing means is a butterfly clip.

5. A combination of claim 1 or 2, wherein said integral means further comprises a bottom plate.

6. A combination of claim 5, wherein said mount further comprises securing means on the back of said back plate.

* * * * *

UNITED STATES PATENT AND TRADEMARK OFFICE
CERTIFICATE OF CORRECTION

PATENT NO. : 4,299,344

DATED : November 10, 1981

INVENTOR(S) : YAMASHITA, et al.

It is certified that error appears in the above—identified patent and that said Letters Patent is hereby corrected as shown below:

Col. 2, Line 19, after "unit" insert --.--; "further"

should be --Further--;

Col. 2, Line 53, "bits" should be --fits--;

Col. 4, Line 9, "with" should be --within--.

Signed and Sealed this

Fourth Day of May 1982

[SEAL]

Attest:

GERALD J. MOSSINGHOFF

Attesting Officer     Commissioner of Patents and Trademarks